United States Patent [19]

Taguchi et al.

[11] Patent Number: 4,710,585

[45] Date of Patent: Dec. 1, 1987

[54] LIQUID CRYSTAL COMPOUND

[75] Inventors: Masaaki Taguchi, Tokyo; Hitoshi Suenaga, Hyogo, both of Japan

[73] Assignees: Seiko Instruments & Electronics Ltd., Tokyo; Teikoku Chemical Industry Co., Ltd., Osaka, both of Japan

[21] Appl. No.: 743,095

[22] Filed: Jun. 10, 1985

[30] Foreign Application Priority Data

Jul. 3, 1984 [JP] Japan .................. 59-137491

[51] Int. Cl.$^4$ ............ C09K 19/12; C09K 19/20; C07C 69/76; C07C 69/78

[52] U.S. Cl. ............... 560/64; 560/66; 560/102; 560/109; 252/299.67; 252/299.65; 350/350 S

[58] Field of Search ............ 252/299.67, 299.65; 560/61, 73, 102, 106, 107, 108, 109, 64, 66; 350/350 S

[56] References Cited

U.S. PATENT DOCUMENTS

| | | | |
|---|---|---|---|
| 3,790,498 | 2/1974 | Katagiri et al. | 252/408 |
| 3,975,286 | 4/1978 | Oh | 252/299 |
| 4,065,489 | 12/1977 | Steinstrasser et al. | 560/59 |
| 4,083,797 | 8/1976 | Oh | 252/299 |
| 4,257,911 | 3/1981 | Gray et al. | 252/299 |
| 4,596,667 | 6/1986 | Inukai et al. | 252/299.65 |
| 4,613,209 | 9/1986 | Goodby et al. | 350/350 S |
| 4,633,012 | 12/1986 | Taguchi et al. | 560/138 |
| 4,643,842 | 2/1987 | Taguchi et al. | 252/299.67 |

FOREIGN PATENT DOCUMENTS

| | | |
|---|---|---|
| 0115693 | 8/1984 | European Pat. Off. . |
| 0136725 | 4/1985 | European Pat. Off. . |
| 53-087986 | 2/1978 | Japan . |
| 53-044535 | 4/1978 | Japan . |

OTHER PUBLICATIONS

Li et al., *Chemical Abstracts*, vol. 94, 1981, 191853.
Arutyunyan et al., *Chemical Abstracts*, vol. 95, 1981, 104173.
Aliev et al, *Chemical Abstracts*, vol. 96, 1982, 133710.
Goodby & Leslie, *Liquid Crystals & Ordered Fluids*, vol. 4, pp. 1-32.

Primary Examiner—Teddy S. Gron
Assistant Examiner—J. E. Thomas
Attorney, Agent, or Firm—Bruce L. Adams; Van C. Wilks

[57] ABSTRACT

A liquid crystal compound represented by the following general formula:

R*—O—A—R or R*COO—A—R wherein R* stands for an alkyl group having an asymmetric carbon atom, R stands for a linear alkyl group, and A stands for 3 Claims, 7 Drawing Figures

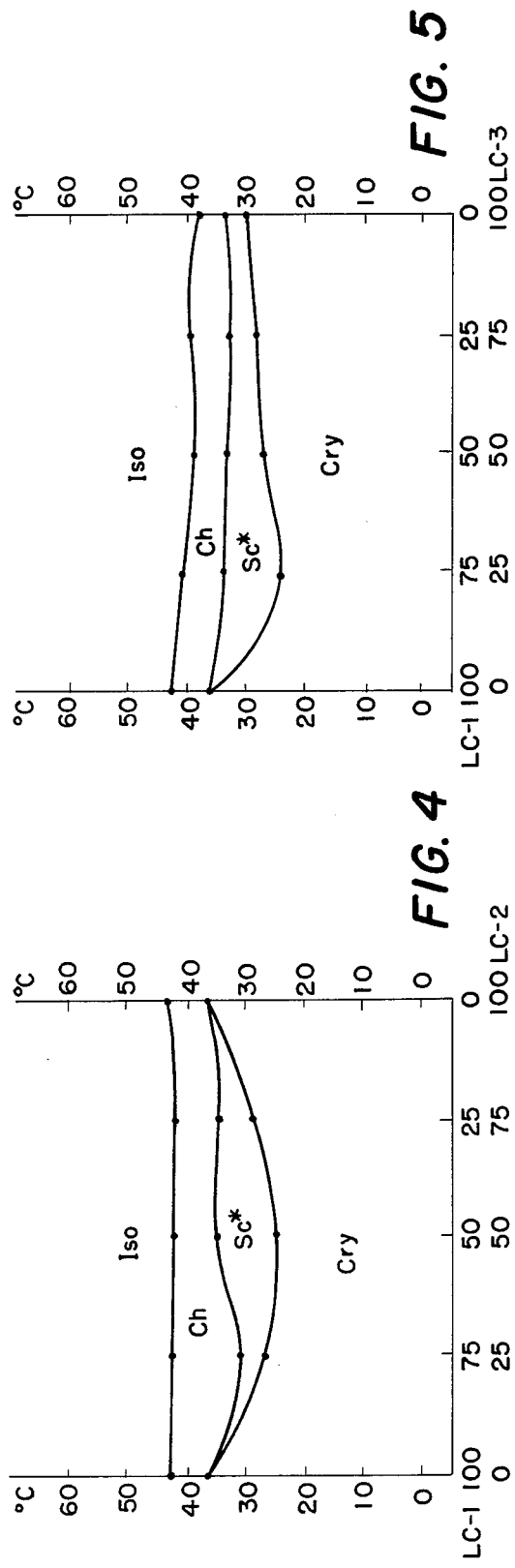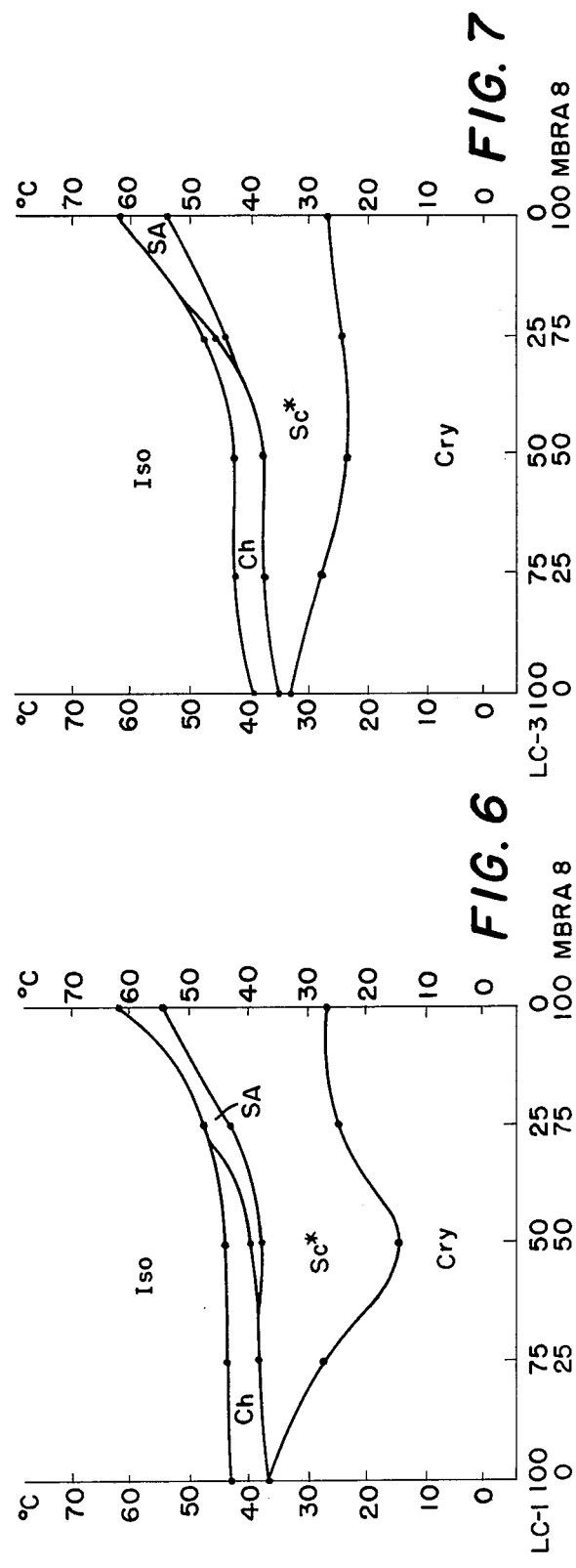

LIQUID CRYSTAL COMPOUND

BACKGROUND OF THE INVENTION

The present invention relates to a novel liquid crystal valuable for an electro-optical element utilizing a response of a ferroelectric smectic liquid crystal to an electric field.

Liquid crystals have been utilized as various electro-optical elements and they are used for displaying in watches or electronic table calculators. Liquid crystal elements used in practice at the present time are mainly based on the dielectric arrangement effect of a nematic liquid crystal or cholesteric liquid crystal. However, in case of expected application to a display element having many image elements, the response characteristics are insufficient and, since no sufficient driving margin can be maintained, the contrast and visual angle characteristics are insufficient. Accordingly, research and development have been vigorously made on a MOS panel or TFT panel in which a switching element is formed for each image element.

Under these circumstances, Clark et al. developed a liquid crystal element based on a new display principle using the smectic phase, in which the above-mentioned defects of the liquid crystal are eliminated. This liquid crystal element will now be described in brief.

FIG. 1 is a diagram illustrating the smectic C* or H phase. The liquid crystal comprises respective molecule layers 1, and the average direction of the long axis of the molecule in these layers is inclined by an angle $\psi_0$ relative to the direction vertical to the layers. In the thesis entitled "Ferroelectric Liquid Crystals" in Le Journal de Physique, Vol. 36 (March 1975, pages L-69 to L-71), Meyer et al. teach that a smectic C* or H liquid crystal composed of optically active molecules generally has an electric dipole density $\vec{P}$ and is ferroelectric. This dipole density $\vec{P}$ is vertical to the inclination direction n of the molecules and is parallel to the layer face of the smectic phase. Although what is taught by them is applicable also to the smectic H phase, the viscousness to rotation around the axis vertical to the layer is large in the phase H. The presence of an electric dipole in this chiral smectic gives a much stronger coupling force to the electric field than in the dielectric anisotropy. Furthermore, this coupling force has a polar characteristic in the sense that the preferred direction of $\vec{P}$ is a direction parallel to $\vec{E}$. Accordingly, if the direction of the applied electric field is inverted, the direction of $\vec{P}$ is inverted. Namely, by inversion of the electric field (the angle $2\psi_0$ of this cone will be referred to as "cone angle" hereinafter), as shown in FIG. 2, the direction of $\vec{P}$ can be controlled by the movement of the molecules along the cone. Accordingly, the liquid crystal can be utilized as an electro-optical element by detecting changes of the molecules in the direction of the average long axis by means of two polarizing plates.

In an electro-optical element utilizing the response of this smectic C* or H phase to an electric field, the coupling force between the spontaneous polarization and the electric field is larger on the order of $10^3$ to $10^4$ than the coupling force by the dielectric anisotropy. Accordingly, the response speed of this element is higher than that of a TN type liquid crystal element and, if appropriate orientation control is selected, a memory characteristic can be given to this element. Therefore, it is expected that this electro-optical element will be applied to a high-speed optical shutter or a display device having a large display information quantity.

Various chiral smectic liquid crystals having this ferroelectric characteristic have heretofore been synthesized and investigated. The ferroelectric liquid crystal first synthesized is p-decyloxybenzilidene-p'-amino.2-methylbutyl cynnamate generally called "DOBAMBC". Liquid crystals of this series represented by the following structural formula have been synthesized and investigated as ferroelectric liquid crystals:

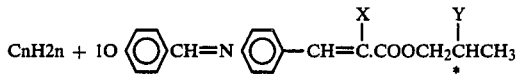

wherein X stands for H, Cl or CN, Y stands for Cl or $C_2H_5$, and the asterisk indicates an asymmetric carbon atom.

Since a liquid crystal of this series shows the chiral smectic phase at a relatively high temperature exceeding room temperature, this liquid crystal is disadvantageous in that the liquid crystal cannot be used at room temperature. Moreover, since this liquid crystal is of the Schiff base type, it is readily decomposed water and its stability is poor.

As an improved liquid crystal developed from the above-mentioned series, B. I. Ostrovskii et al. [Ferroelectrics, 24, 309 (1980)] and A. Hallsby et al. [Mol. Cryst. Liq. Cryst., Letter 82, 61 (1982)] proposed a chiral smectic liquid crystal compound of the Schiff base type having a hydroxyl group introduced into one benzene ring and a hydrogen bond in the molecule, as represented by the following general formula:

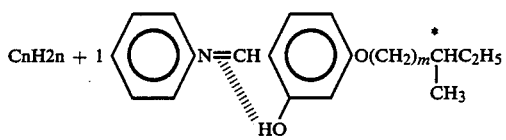

and this compound has attracted attention in the art as a compound showing the smectic C* phase in a broad temperature range including room temperature. Since this compound contains a hydrogen bond in the molecule, it is little decomposed by water and is excellent in stability when compared with ordinary liquid crystals of the Schiff base type. However, this compound is still ineffective because non-crystallization even at temperatures lower than 0° C. is required in practice.

An azoxy type liquid crystal material was reported by P. Keller et al. [Ann. Phys., 139 (1978)]. However, since the applicable temperature range is insufficient and this liquid crystal is a densely yellow compound, this liquid crystal material can not be put into practical use.

An ester type liquid crystal which is characterized by its stability has been noted among TN type liquid crystal materials. In the known literature reference, B. I. Ostrovskii et al. reported that a compound represented by the following formula:

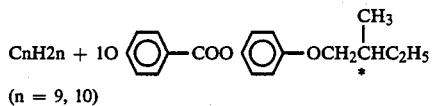

(n = 9, 10)

is a material showing a chiral smectic liquid crystal phase at temperatures relatively close to room temperature. Moreover, G. W. Gray et al. [Mol. Cryst. Liq. Cryst., 37, 189 (1976) and 48, 37 (1978)] reported a biphenyl ester type material showing a chiral smectic liquid crystal phase at relatively high temperatures.

SUMMARY OF THE INVENTION

As is apparent from the foregoing description, a liquid crystal material that can be put into practical use and shows a chiral smectic phase in a broad temperature range including room temperature has not yet been developed. Furthermore, a material showing a chiral smectic phase in a relatively broad temperature range is poor in stability.

It is therefore an object of the present invention to provide novel liquid crystal compounds which are valuable for obtaining a liquid crystal composition showing a chiral smectic phase in a broad temperature range including room temperature and having good stability.

BRIEF DESCRIPTION OF DRAWINGS

FIGS. 4, 5, 6 and 7 are phase diagrams of blends comprising two kinds of liquid crystals.

DETAILED DESCRIPTION OF THE INVENTION

Figure 1:
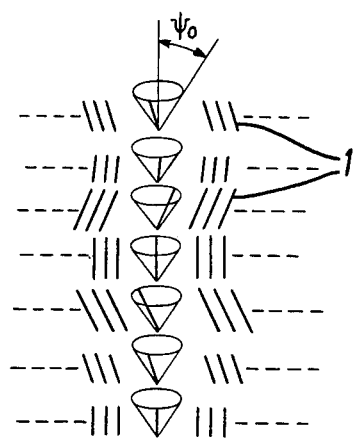
FIG. 1 is a model illustrating the smectic C* phase or H phase.
Figure 2:
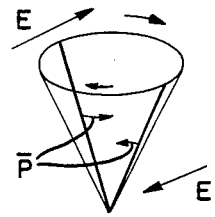
FIG. 2 is a model showing the movement of the liquid crystal molecules of the chiral smectic phase along the cone by an electric field.

With a view to solving the above problem, we have synthesized a novel optically active liquid crystal compounds represented by the following general formulae:

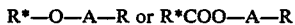

wherein R* stands for an alkyl group having an asymmetric carbon atom, R stands for a linear alkyl group, and A stands for

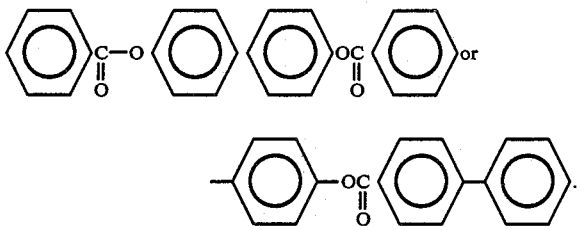

Most of the liquid crystal compounds represented by the above general formulae show an Sc* phase at temperatures close to room temperature, and it was found that when these liquid crystal compounds are blended, there can be obtained liquid crystal compositions showing an Sc* phase even at low temperatures. It was also found that most of the compounds represented by the above formulae and having a short side chain do not show an Sc* phase but show only a cholesteric phase, but when these compounds are blended with other liquid crystal compounds showing an Sc* phase, there can be obtained liquid crystal compositions showing an Sc* phase even at low temperatures and these compounds can be used as blending materials.

Moreover, from the results of experiments made by us, it was found that in compounds represented by the following general formulae

wherein R* stands for an alkyl group having an asymmetric carbon atom, R stands for a linear alkyl group, and A stands for

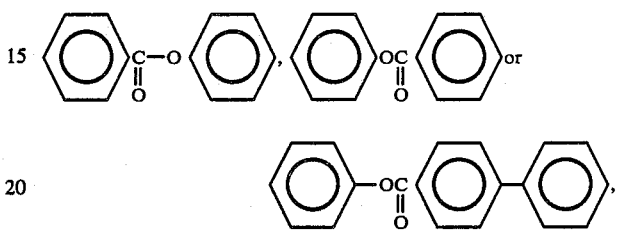

if —O— or —COO— is introduced into both the side chains, the mutual action in the lateral direction of the molecule is strengthened, since this —O— or —COO— has a strong dipole in the direction of the short axis of the molecule (hereinafter referred to as "lateral direction") and there are present two of such groups. Hence the compounds have high smectic characteristics and show an Sc* phase in a broad temperature range higher than room temperature, but very little movement along the cone occurs because of the strong mutual action in the lateral direction and the response characteristics are poor. In contrast, in the case of liquid crystal compounds having a dipole in the lateral direction only in one side chain, as in the liquid crystal compounds of the present invention, the mutual action in the lateral direction of the molecule is weakened and the smectic characteristics are reduced. Accordingly, most of these compounds show an Sc* phase at low temperatures close to room temperature and they have a considerably higher response speed than liquid crystal compounds having —O— or —COO— introduced into both the side chains.

It was also found that a liquid crystal compound having a molecule skeleton including three biphenyl ester rings show an Sc* phase at temperatures higher than in the case of a liquid crystal compound having two rings and hence, this liquid crystal compound can be used as a blending material increasing the upper limit temperature of the Sc* phase of a liquid crystal composition.

The present invention will now be described in detail with reference to the following examples.

EXAMPLE 1

The process for the synthesis of optically active 4"-octylphenyl 4'-(6-methyloctyloxy)benzoate is now described.

First Stage

A 50-ml three-neck flask was charged with 2.01 g of sodium hydroxide, 10 ml of water and 20 ml of ethanol, and 3.16 g of 4-n-hydroxybenzoic acid was dissolved in the charge. 4.75 g of optically active 1-bromo-6-methyloctane synthesized from commercially available amyl alcohol was added to the mixture, and reaction was carried out for 19 hours under heat and reflux. After completion of the reaction, ether washing was conducted, and the aqueous layer was recovered by filtration and made acidic. The precipitated crystals were recovered by filtration and purified to obtain 4.75 g of 4-(6-methyloctyloxy)benzoic acid.

| $v_{max(cm^{-1})}^{nujol}$ 2500~2200 | $\delta_{TMS(ppm)}^{CDCl_3}$ 11.54, broad s, 1H |
|---|---|
| 1675 | 8.08, d J = 9 Hz, 2H |
| 1605 | 6.94, d J = 9 Hz, 2H |
| 1580 | 3.99, t J = 6 Hz, 2H |
| 1250 | |

Second Stage

To 2.2 g of optically active 4-(6-methyloctyloxy)benzoic acid was added 11 ml of thionyl chloride, and reaction was carried out for 4 hours under heat and reflux. Excessive thionyl chloride was removed by distillation under reduced pressure to recover an oily acid chloride.

($v_{max}^{film}$ 1765, 1740 cm$^{-1}$)

Under ice cooling, 1.72 g of 4-n-octylphenol and 10 ml of dry pyridine were added to the oily acid chloride, and reaction was carried out overnight while the temperature was gradually elevated to room temperature. After the reaction, the precipitate was recovered by filtration and extracted with ether. The ether layer was washed with water, 2N HCl and 5% NaOH in sequence and was then washed with water and a saturated aqueous solution of sodium chloride until the organic layer became nuetral. The organic layer was dried and ether was distilled under reduced pressure to obtain a crystalline compound. The above procedures were repeated to effect purification and obtain 3.21 g of the intended ester.

| $v_{max(cm^{-1})}^{nujol}$ 1740 | $\delta_{TMS(ppm)}^{CDCl_3}$ 6.84~8.19, m, 8H Aromatic H |
|---|---|
| 1610 | 3.98, tJ = 6 Hz, 2H, —CH$_2$—O— |
| 1580 | 2.59, t 2H, —CH$_2$—Ar |

This liquid crystal showed the following phase transition:

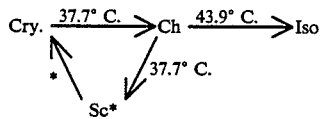

The mark "*" indicates super-cooling.

This liquid crystal compound had a monotropic smectic liquid crystal phase but it showed an Sc* phase for a long time at room temperature, that is, in a super-cooled state.

The liquid crystal compound was inserted between base plates monoaxially oriented by PVA rubbing, and the thickness of the liquid crystal layer was adjusted and characteristics were determined under a crossing nicol by applying a voltage of ±10 V. The measurement temperature was 30° C.

Cone angle: 44°
Contrast (Ton/Toff): 14.0
Response speed: 1.0 msec

EXAMPLE 2

The process for the synthesis of optically active 4'-(6'-methyloctyloxy)phenyl 4-n-octylbenzoate is now described.

First Stage

A 25 ml-flask was charged with 0.637 g of hydroquinone, 1 g of optically active 1-bromo-6-methyloctane, 0.667 g of anhydrous potassium carbonate and 4 ml of N,N-dimethylformamide, and reaction was carried out at 90° C. for 9.5 hours. After the reaction, insoluble substances were recovered by filtration and extracted with ether. The ether layer was washed with water and a saturated aqueous solution of sodium chloride and dried, and ether was removed by distillation under reduced pressure. The obtained crude product was purified by silica gel chromatography to obtain 0.32 g of optically active 4-(6'-methyloctyloxy)phenol.

| $v_{max(cm^{-1})}^{film}$ 3350 | |
|---|---|
| 1520 | |
| 1110 | |
| $\delta_{TMS(ppm)}^{CDCl_3}$ | 6.73, s, 4H Aromatic H |
| | 5.42, broad s, 1H —OH |
| | 3.87, t J = 6 Hz, 2H —CH$_2$—O— |

Second Stage

To 2.97 g of n-octyl benzoate was added 15 ml of thionyl chloride, and reaction was carried out for 4 hours under reflux. Excessive thionyl chloride was removed by distillation under reduced pressure to obtain an oily acid chloride.

($v_{max}^{film}$ 1775, 1740, 1602 cm$^{-1}$)

Third Stage

Under ice cooling, 3 g of 4-(6-methyloctyl)phenol obtained as in the first stage and 10 ml of dry pyridine were added to the above acid chloride, and reaction was conducted overnight while the temperature was gradually elevated to room temperature. After completion of the reaction, the precipitate was recovered by filtration and extracted with ether. The ether layer was washed with water, 2N HCl and 5% NaOH in sequence, and the ether layer was washed with water and a saturated aqueous solution of sodium chloride. The organic layer was dried and the solvent was removed by distillation under reduced pressure. The obtained residue was repeatedly refined to obtain 4.48 g of the intended ester.

| $v_{max(cm^{-1})}^{nujol}$ 1742 | $\delta_{TMS(ppm)}^{CDCl_3}$ 6.85~8.22, m, 8H, Aromatic H |
|---|---|
| 1615 | 3.94, t J = 6 Hz, 2H, —CH$_2$—O— |
| 1600 | 2.70, t, 2H, —CH$_2$—Ar |

This liquid crystal compound showed the following phase transition:

$$\text{Cry.} \xrightarrow{37.2° \text{ C.}} \text{Ch} \xrightarrow{43.8° \text{ C.}} \text{Iso}$$
$$32.9° \text{ C.} \searrow \text{Sc*} \nearrow 35.2° \text{ C.}$$

This liquid compound was a monotropic smectic liquid crystal.

The liquid crystal compound was inserted between substrates monoaxially oriented by PVA rubbing, and the thickness of the liquid crystal layer was adjusted to 3 μm and the characteristics were determined under a crossing nicol by applying a voltage of ±10 V. The measurement temperature was 34° C.

Cone angle: 40° C.
Contrast (Ton/Toff): 9.5
Response speed: 1.7 msec

EXAMPLE 3

The process for the synthesis of optically active 4'-n-octylphenyl 4-(5-methylheptylcarboxy)benzoate is now described.

First Stage

Synthesis of 4'-n-octylphenyl 4-benzyloxybenzoate

A 100-ml flask was charged with 8.2 g of 4-benzyloxybenzoic acid and 50 ml of thionyl chloride, and reaction was carried out under reflux for 2.5 hours. Excessive thionyl chloride was distilled under reduced pressure to obtain a crude crystal. Recrystallization gave 7.9 g of an acid chloride.

($\nu_{max}^{nujol}$ 1770, 1600 cm$^{-1}$) m.p. 106~108.2° C.

To a mixture of 35 ml of dry pyridine and 5.01 g of 4-n-octylphenol was added 6 g of the acid chloride under ice cooling. The temperature was gradually elevated to room temperature and reaction was carried out at 50° C. for 2 hours. After completion of the reaction, the precipitate was recovered by filtration and extracted with ethyl acetate. The organic layer was washed with water, 2N HCl, water, 5% NaOH, water and a saturated aqueous solution of sodium chloride in sequence and dried, and the organic solvent was distilled under reduced pressure. The obtained crude product was purified by column chromatography to obtain 8.13 g of an ester.

| m.p. 119.5~120.5° C. | | |
|---|---|---|
| $\nu_{max(cm^{-1})}^{nujol}$ 1715 | $\delta_{TMS(ppm)}^{CDCl_3}$ 6.97~8.24, m, | 13H, Aromatic H |
| 1605 | 5.11, S, | 2H, —O—CH$_2$— |
| | 2.10, t, | 2H, —CH$_2$—Ar |

Second Stage

Synthesis of 4'-n-octylphenyl 4-hydroxybenzoate

A flask was charged with 7.3 g of 4'-n-octylphenyl 4-benzyloxybenzoate, 0.73 g of 10% Pd/C and 250 ml of ethyl acetate. The mixture was stirred at an oil bath temperature of 45° C. until the mixture reacted with a theoretical amount of hydrogen. After completion of the reaction, the crystal was removed by filtration and the organic solvent was distilled. The obtained crude crystal was recrystallized to obtain 5.43 g of 4'-n-octylphenyl 4-hydroxybenzoate.

| m.p. 129.5~130.8° C. | | | |
|---|---|---|---|
| $\nu_{max(cm^{-1})}^{nujol}$ 3460 | $\delta_{TMS(ppm)}^{CDCl_3}$ 6.60~8.01, | m, | 8H, Aromatic H |
| 3370 | 2.54, t, | | 2H, —CH$_2$—Ar |
| 1730 | | | |

Third Stage

Synthesis of optical active 4'-n-octylphenyl 4-(5-methylheptylcarboxy)benzoate

To 2 g of optically active 6-methyloctanoic acid was added 15 ml of thionyl chloride, and reaction was carried out under reflux for 2 hours. After completion of the reaction, excessive thionyl chloride was distilled under reduced pressure to obtain an oily acid chloride.

($\nu_{max}^{film}$ 1800, 1480 cm$^{-1}$)

Under ice cooling, 4.23 g of 4'-octylphenyl 4-hydroxybenzoate and 30 ml of dry pyridine were added to the acid chloride, and reaction was carried out overnight while the temperature was gradually elevated to room temperature. After completion of the reaction, the precipitate was recovered by filtration and extracted with ether. The ether layer was washed with water, 2N HCl and 5% NaOH in sequence, and then with water and a saturated aqueous solution of sodium chloride until the ether layer became neutral. The ether layer was dried and ether was distilled under reduced pressure. The residue was refined repeatedly to obtain 1.38 g of the intended ester.

$\nu_{max}^{nujol}$ (cm$^{-1}$) 1765
1722
1605

$\delta_{TMS}^{CDCl_3}$ (ppm) 6.99~8.30, m, 8H, Aromatic H $$2.47~2.77, \text{ m, 4H, } —CH_2—\overset{\overset{\displaystyle O}{\|}}{C}, —CH_2—Ar$$

This liquid crystal compound showed the following phase transition:

$$\text{Cry.} \underset{\longleftarrow}{\xrightarrow{33.7° \text{ C.}}} \text{Sc*} \xrightarrow{35.3° \text{ C.}} \text{Ch} \xrightarrow{39.9° \text{ C.}} \text{Iso}$$

The liquid crystal compound was inserted between substrates monoaxially oriented by PVA rubbing, and the thickness of the liquid crystal layer was adjusted to 3 μm. The characteristics were determined under a crossing nicol by applying a voltage of ±10 V. The measurement temperature was 34° C.

Cone angle: 40°
Contrast (Ton/Toff): 10.5
Response speed: 700 μsec

EXAMPLE 4

The process for the synthesis of optically active b 4"-(6"-methyloctyloxy)phenyl 4-n-heptylbiphenyl-4'-carboxylate is now described.

First Stage

Synthesis of optically active benzyloxyphenyl 6-methyloctyl ether

A 100-ml 4-neck flask was charged with 3.74 g of NaH (containing 50% of oil) and 50 ml of N,N-dimethylformamide, and a solution of 15.46 g of hydroquinone monobenzyl ether in 30 ml of N,N-dimethylformamide was added under a nitrogen current over a period of 20 minutes in an ice water bath. After 20 minutes, 16 g of optically active 1-bromo-6-methyloctane was added over a period of 45 minutes, and reaction was carried out at room temperature for 6 hours. The reaction mixture was extracted with ether. The ether layer was washed with water, 5% NaOH, water and a saturated aqueous solution of sodium chloride in sequence and dried, and the organic solvent was distilled under reduced pressure to obtain a crude product. The crude product was purified to obtain 24.37 g of an ether compound.

$\nu_{max(cm-1)}^{film}$ 1590

$\delta_{TMS(ppm)}^{CDCl_3}$ 7.37~7.67, m, 5H, Aromatic H 1505      6.87, S, 4H, Aromatic H 1110      4.99, S, 2H, —O—$\underline{CH_2}$—Ar 3.87, t J = 6 Hz, 2H, —CH$_2$—$\underline{CH_2}$—O—

Second Stage

Synthesis of optically active 4-(6'-methyloctyloxy)-phenol

A flask was charged with 23.37 g of optically active 4-benzyloxyphenyl 6-methyloctyl ether, 2.33 g of 10% Pd/C and 230 ml of ethanol, and the mixture was reacted at room temperature until it reacted with a theoretical amount of hydrogen. After completion of the reaction, the catalyst was removed by filtration and the organic solvent was distilled under reduced pressure to obtain a crude product. The crude product was refined to obtain 16.91 g of the intended phenol.

$\nu_{max(cm-1)}^{film}$ 3350

1520

1110

$\delta_{TMS(ppm)}^{CDCl_3}$ 6.73, S, 4H Aromatic H 5.42, broad s, 1H —OH 3.87, t J = 6Hz, 2H —$\underline{CH_2}$—O—

Third Stage

Synthesis of 4-n-heptylbiphenyl-4'-carboxylic acid

A 500-ml 4-neck flask was charged with 43.26 g of sodium hydroxide, 120 ml of ethanol and 120 ml of water, and 10 g of 4'-n-heptyl-4-cyanobiphenyl was added at room temperature. The mixture was reacted under heat and reflux for 18 hours. After completion of the reaction, the reaction mixture was thrown into ice water and made acidic by using concentrated hydrochloric acid.

The precipitated crystals were recovered by filtration and dried, and the crude crystals were recrystallized to obtain 8.92 g of 4-n-heptylbiphenyl-4'-carboxylic acid.

$\nu_{max(cm-1)}^{nujol}$ 2750~2000

1680

1605

$\delta_{TMS(ppm)}^{DMSO-d_6}$ 7.24~8.18, m, 8H, Aromatic H 2.62, t, 2H, —$\underline{CH_2}$—Ar

Fourth Stage

Synthesis of 4"-(6"-methyloctyloxy)phenyl 4-n-heptylbiphenyl-4'-carboxylate

To 3 g of 4-n-heptylbiphenyl-4'-carboxylic acid was added 30 ml of thionyl chloride, and reaction was carried out under heat and reflux for 4.5 hours. Excessive thionyl chloride was distilled under reduced pressure to obtain an oily acid chloride.

($\nu_{max}^{film}$ 1770, 1740, 1600 cm$^{-1}$)

To this acid chloride were added 2.39 g of 4-(6-methyloctyloxy)phenol and 20 ml of dry pyridine under ice cooling. The temperature was elevated to room temperature and reaction was carried out overnight at 45° C. After completion of the reaction, the precipitate was recovered by filtration and extracted with ether. The organic layer was washed with water, 2N HCl and 5% NaOH in sequence and further washed with water and a saturated aqueous solution of sodium chloride until the organic layer became neutral. The ether layer was dried and ether was distilled under reduced pressure. The obtained crude product was repeatedly refined to obtain 4.07 g of an ester.

$\nu_{max(-cm-1)}^{nujol}$ 1735

1610

1110

$\delta_{TMS(ppm)}^{CDCl_3}$ 6.81~8.30, m, 12H, Aromatic H 3.92, t J = 6 Hz, 2H, —$\underline{CH_2}$—O—

2.64, t, 2H, —$\underline{CH_2}$—Ar

This liquid crystal compound showed the following phase transition:

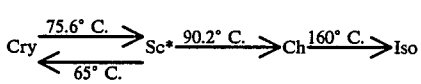

Since this liquid crystal compound (referred to as "LC-4") shows an Sc* phase at temperatures much higher than room temperature, it can be used as a blending material for elevating the upper limit temperature of the Sc* phase in a liquid crystal composition.

In order to check the influence of this liquid crystal compound on the response speed, one part of this compound was blended with one or three parts of MBRA8 represented by the following structural formula:

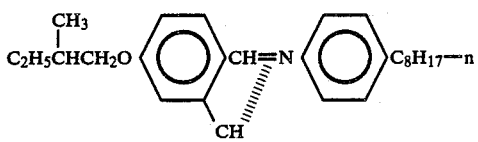

and data of the temperature dependency of the response speed in the resulting liquid crystal compound were collected. For comparison's sake, also data of MBRA8 alone were collected. These data are shown in FIG. 3.

These data were collected under a crossing nicol by inserting the sample between substrates monoaxially oriented by PVA rubbing so that the thickness of the liquid crystal layer was 3 μm and applying a voltage of ±10 V.

Figure 3:
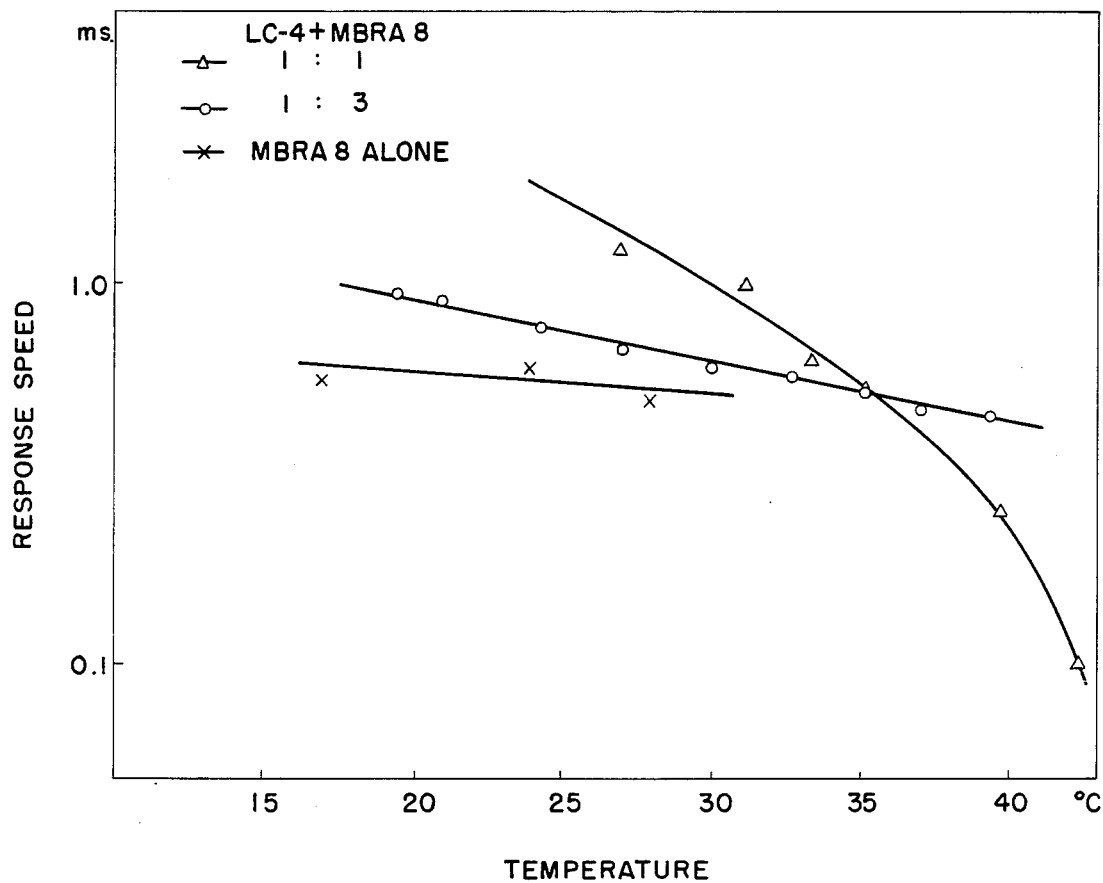
FIG. 3 is a graph showing the temperature dependency of the response speed.

It was found that, as shown in FIG. 3, the response speed is barely reduced even if this liquid crystal compound is mixed with MBRA8.

EXAMPLE 5

A phase diagram of a blend of the liquid crystal compound of Example 1 (referred to as "LC-1") and the liquid crystal compound of Example 2 (referred to as "LC-2") is shown in FIG. 4.

Since the change of the phase during the elevation of the temperature is shown in FIG. 4, each of LC-1 and LC-2 is indicated in the form not showing the Sc* phase in FIG. 1.

As is seen from FIG. 4, it is obvious that a liquid crystal composition showing the Sc* phase at temperatures close to room temperature can be obtained by blending LC-1 and LC-2.

EXAMPLE 6

A phase diagram of a blend of the liquid crystal compound of Example 1 (referred to as "LC-1") and the liquid crystal compound of Example 3 (referred to as "LC-3") is shown in FIG. 5.

As is apparent from FIG. 5, it has been confirmed that a liquid crystal composition showing the Sc* phase at temperatures close to room temperature can be obtained by blending LC-1 and LC-3.

EXAMPLE 7

A phase diagram of a blend of the liquid crystal compound of Example 1 (referred to as "LC-1") and MBRA8 is shown in FIG. 6.

As is apparent from FIG. 6, it has been confirmed that a liquid crystal composition showing the Sc* phase even at temperatures lower than room temperature can be obtained by blending LC-1 and MBRA8.

EXAMPLE 8

A phase diagram of a blend of the liquid crystal compound of Example 3 (referred to as "LC-3") and MBRA8 is shown in FIG. 7.

As is apparent from FIG. 7, it has been confirmed that a liquid crystal composition showing the Sc* phase at temperatures close to room temperature can be obtained by blending LC-3 and MBRA8.

As is seen from the results of the foregoing examples, the novel liquid crystal compounds of the present invention have good response characteristics and are blending materials effective in obtaining a liquid crystal composition showing the C* phase at temperatures close to room temperature or elevating the upper limit temperature of the Sc* phase. Accordingly, these novel liquid crystal compound is epoch-making materials for obtaining a practical liquid crystal composition showing the Sc* phase in a broad temperature range including room temperature.

What is claimed is:

1. A liquid crystal compound selected from the group consisting of 4''-octylphenyl 4'-(6-methyloctyloxy)benzoate, 4'-(6'-methyloctyloxy)phenyl 4-n-octylbenzoate, 4'-n-octylphenyl 4-(5-methylheptylcarboxy)-benzoate, and 4''-(6''-methyloctyloxy)phenyl 4-n-heptylbiphenyl-4'-carboxylate.

2. A liquid crystal compound of the formula

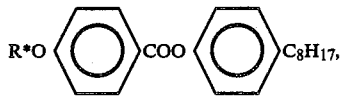

wherein R* is

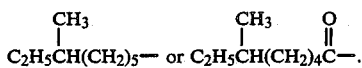

3. 4''-octylphenyl 4'-(6-methyloctyloxy)benzoate.

* * * * *